Oct. 10, 1950  O. E. SZEKELY  2,524,853
DRIVE MEANS
Filed Dec. 3, 1947  2 Sheets-Sheet 1
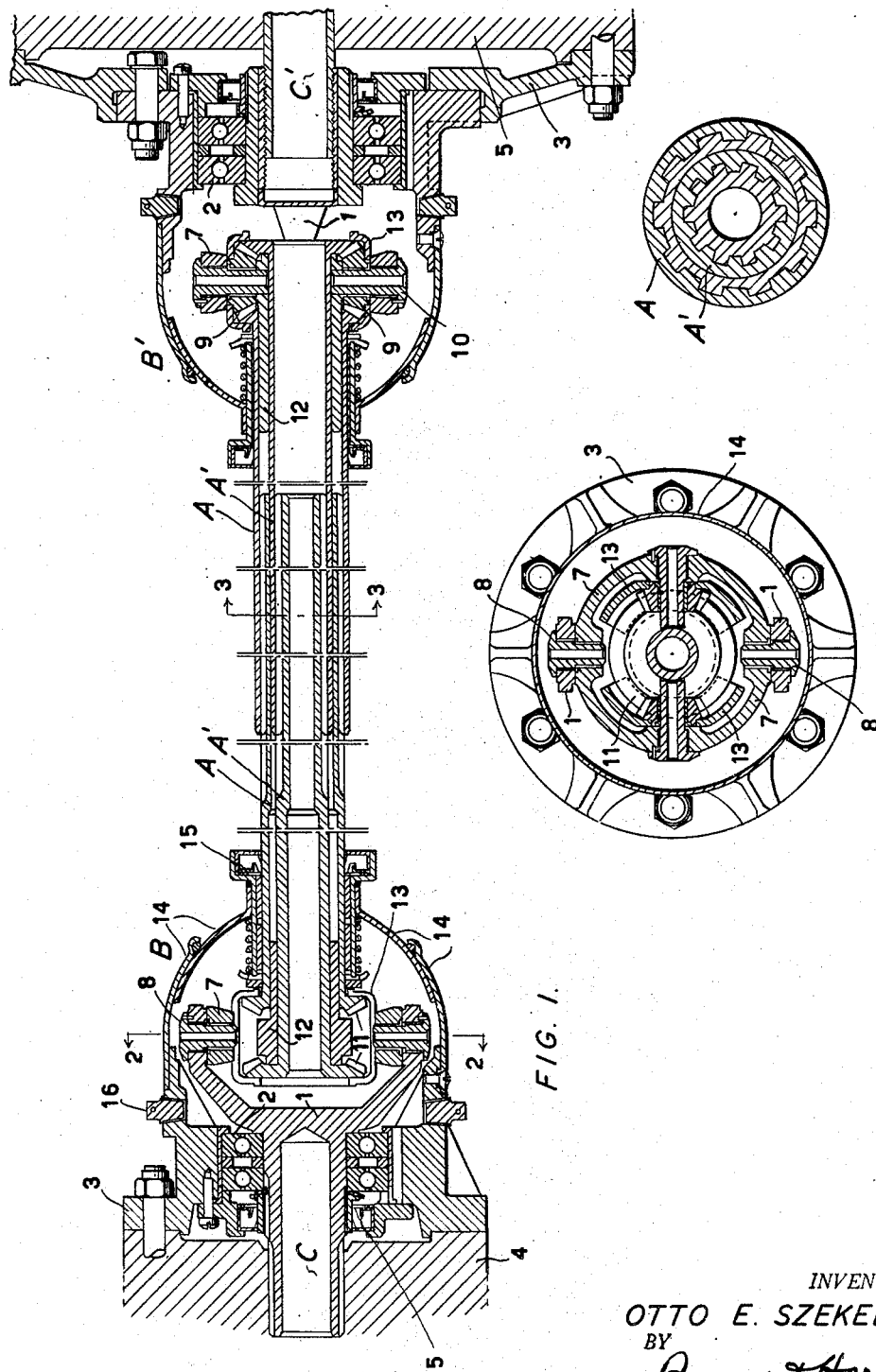
INVENTOR.
OTTO E. SZEKELY
BY
Busser & Harding
ATTORNEYS Oct. 10, 1950     O. E. SZEKELY     2,524,853
DRIVE MEANS Filed Dec. 3, 1947     2 Sheets-Sheet 2

INVENTOR.
OTTO E. SZEKELY
BY
*Busser + Harding*
ATTORNEYS

Patented Oct. 10, 1950

2,524,853

UNITED STATES PATENT OFFICE 2,524,853

DRIVE MEANS

Otto E. Szekely, Philadelphia, Pa., assignor, by mesne assignments, to O. E. Szekely & Associates, Inc., Philadelphia, Pa., a corporation of Pennsylvania Application December 3, 1947, Serial No. 789,539

2 Claims. (Cl. 74—797)

This invention relates to a novel and efficient drive means.

More particularly this invention relates to drive means so constructed as to afford a driving connection between a driving shaft and a driven shaft, the axes of which are in angular relationship, with maintenance of constant velocity of the driven shaft.

As is well known, in driving connections between shafts the axes of which lie in different planes or in angular relationship, it is customary to provide a universal joint or joints to compensate for the necessary angularity of the driving connection. And it is equally well known that in such cases heretofore, unless the axes of the driving and driven shafts be in line, or in parallelism as where the shafts lie in different planes without angularity, the velocity of the driven shaft will constantly vary due to the break-over of the universal joint or joints.

In many cases the variation in velocity of the driven shaft, where a universal joint or joints is used in a driving connection, is of no consequence. However, in numerous cases, as, for example, where an alternating current generator is to be driven and variation in cycle of the current cannot be tolerated, as in aircraft, the axes of the driving shaft and of the generator have heretofore been required to be in parallelism.

Now in accordance with this invention driving means are provided, including universal joint means, which, given constant input velocity, gives constant output velocity irrespective of angularity between the input and output.

Having now indicated, in a general way, the nature and purpose of this invention, I will proceed to a detailed description of a preferred embodiment thereof with reference to the accompanying drawings, in which:

Figure 1 is a sectional view of driving means embodying this invention.

Figure 2 is a sectional view on line 2—2, Figure 1.

Figure 3 is a sectional view on line 3—3, Figure 1.

Figure 4:
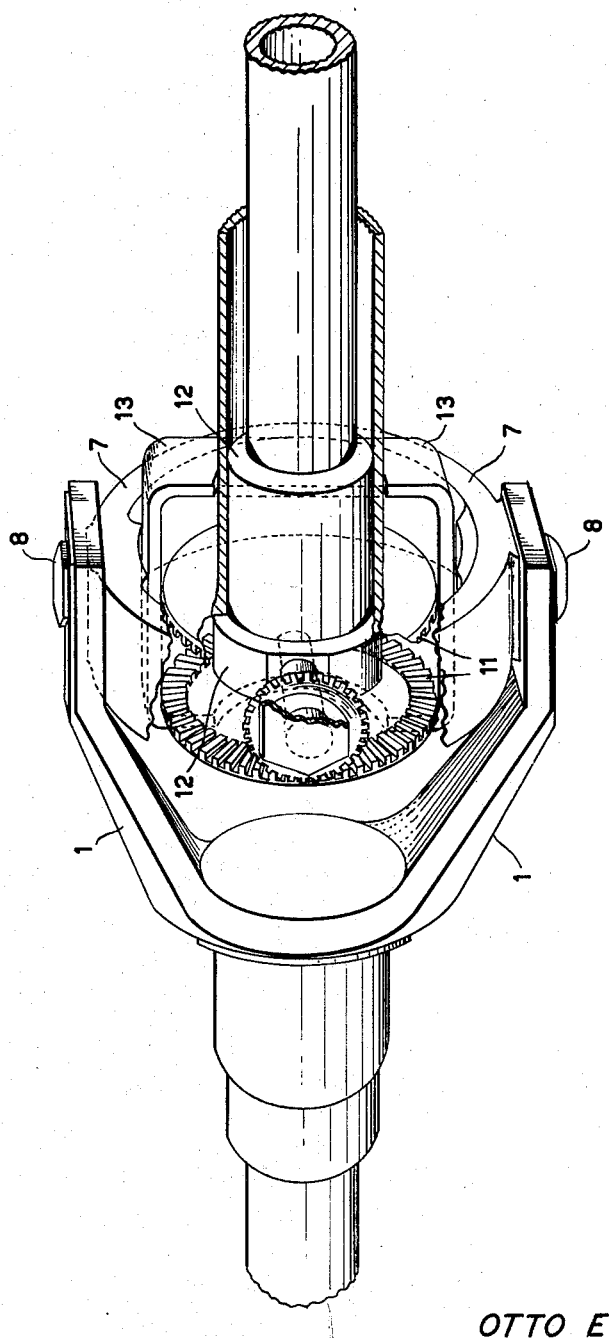
Figure 4 is a perspective view, partly in section, of an element of the driving means shown in Figure 1.

Referring to the several figures in which similar parts are indicated by similar reference symbols, the driving means according to this invention comprises essentially a pair of concentric shafts A, A' and a pair of universal joints B, B', of similar particular construction. The universal joints B, B', connected respectively to a driving shaft C and a driven shaft C', are connected together by the concentric shafts A, A'.

In detail, the universal joints each comprise a yoke 1, mounted in bearings 2 carried by a flange 3. The flanges 3 are respectively secured to, for example, the casing 4 of a prime mover, as an engine, and to the casing 5 of an element to be driven, as a generator. The yokes 1 are respectively connected to the driving or engine shaft C and to the driven or generator shaft C'.

The arms of yokes 1 are oppositely connected to rings 7 by means of bolts 8 and the rings carry pinions 9 secured thereto by means of bolts 10.

The concentric shafts A, A', which desirably are respectively made in sections splined together, the spline permitting variation in the distance between the two joints, as shown in Figure 3, carry oppositely facing spaced bevel gears 11 on their ends. The bevel gears 11 may be secured to the ends of shafts A, A' in any suitable manner, as with a key or splines.

The end portions of the shafts A, A' are centered by means of bushings 12, which are drilled for the reception of the ends of the bolts 10 by which the pinions 9 are secured to the rings 7; the bevel gears 11 are retained by gear retainers 13.

The bevel gears 11 at the ends of shafts A, A' are engaged by the pinions 9 carried by the yokes 1.

The assemblies comprising the yokes 1, rings 7, pinions 9 and bevel gears 11 are enclosed by sliding bell housings 14, one element of which is secured to the flange 3 and the other element of which surrounds shaft A. Oil retaining means 15 are provided to the end that the housing may be partially filled with oil, through openings normally closed by plugs 16, for the lubrication of the universal joint assemblies.

Assuming that the shaft C' is out of line with or at an angle to the shaft C, when the shaft C is driven, the shafts A, A' will be driven by the yoke 1 on shaft C through ring 7 and pinions 9 engaged with bevel gears 11 and the shaft C' will correspondingly be driven by shafts A, A' through the engagement of the bevel gears 11 with pinions 9 on ring 7 carried by yoke 1 on shaft C'.

In operation, since the drive shaft C and driven shaft C' are in an angular relation or out of line, the shafts A, A' will periodically rotate relative to each other and at varying speed of rotation due to break-over of the joints B, B' which will cause the pinions 9 of the universal joints B and B' to turn slightly on their axes, the pinions of one joint turning in a direction opposite to that of the pinions of the other joint with the break-over of the respective joints. This turning movement of the pinions 9 of the joints, respectively, causes the bevel gears 11 of the joints, respectively, to move in opposite directions relative to one another with the result that the driven shaft C' rotates at a constant speed.

Thus, the speed of rotation or velocity variation due to the break-over of the joints B, B' is compensated for, and the shaft C' driven at a constant velocity, by the rotation of the bevel gears 11 of the joints, respectively, in complementary directions, relative to one another, which is caused by the opposite rotation of the pinions 9 of the joints, respectively, which, as it were, permit slippage between the gears while they are rotated by the bodily rotation of pinions 9.

It will be understood that the essence of this invention lies in the provision of concentric shafts, the input to and the output from which is through yokes connected thereto by means permitting slippage, as pinions carried by the yokes and in engagement with gears on the shafts, or equivalent elements.

What I claim and desire to protect by Letters Patent is:

1. Drive means having an input and an output end, each of said ends comprising a yoke, a ring pivotally secured to said yoke, oppositely facing pinions rotatably secured to the ring, and oppositely facing gears in mesh with said pinions, a shaft connecting one of said gears in the input end with one of said gears in the output end and a second shaft concentric with the first shaft connecting the second of said gears in the input end with the second of said gears in the output end.

2. Drive means having an input and an output end, each comprising a yoke adapted to be connected to a shaft, a ring pivotally secured to said yoke, oppositely facing pinions rotatably secured to the ring and having axes which lie 90° from the axis on which the ring pivots and oppositely facing gears in mesh with said pinions and having axes which lie in a common plane with the axes of the pinions, a shaft connecting one of said gears in the input end with one of said gears in the output end and a second shaft concentric with the first shaft connecting the second of said gears in the input end with the second of said gears in the output end.

OTTO E. SZEKELY.

REFERENCES CITED

The following references are of record in the file of this patent:

UNITED STATES PATENTS

| Number | Name | Date |
|---|---|---|
| 1,498,678 | Chavrier | June 24, 1924 |
| 2,065,999 | Faure et al. | Dec. 29, 1936 |
| 2,139,963 | Leason | Dec. 13, 1938 |
| 2,300,424 | Jones | Nov. 3, 1942 |

FOREIGN PATENTS

| Number | Country | Date |
|---|---|---|
| 796,649 | France | Jan. 27, 1936 |